(12) United States Patent
Springer

(10) Patent No.: US 11,682,200 B1
(45) Date of Patent: Jun. 20, 2023

(54) CROSS-MEDIUM COPYING OF SELECTIONS OF CONTENT SHARED DURING A VIDEO CONFERENCE

(71) Applicant: Zoom Video Communications, Inc., San Jose, CA (US)

(72) Inventor: Shane Paul Springer, Manchester, MI (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/877,780

(22) Filed: Jul. 29, 2022

(51) Int. Cl.
| | | |
|---|---|---|
| G06V 10/94 | (2022.01) | |
| G06V 30/19 | (2022.01) | |
| G06T 7/13 | (2017.01) | |
| H04N 5/77 | (2006.01) | |
| H04L 12/18 | (2006.01) | |
| G06V 20/40 | (2022.01) | |

(52) U.S. Cl.
CPC ............. *G06V 10/945* (2022.01); *G06T 7/13* (2017.01); *G06V 20/41* (2022.01); *G06V 30/19* (2022.01); *H04L 12/1813* (2013.01); *H04N 5/77* (2013.01); *G06T 2200/24* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 8,689,142 B2* | 4/2014 | Pugsley | G06F 16/634 |
| | | | 715/810 |
| 9,009,581 B2* | 4/2015 | Herberger | G06F 16/40 |
| | | | 715/202 |
| 10,091,260 B2 | 10/2018 | Sanso et al. | |
| 10,594,749 B2 | 3/2020 | Sanso et al. | |
| 10,630,738 B1* | 4/2020 | Vendrow | G06F 16/433 |
| 2009/0089651 A1* | 4/2009 | Herberger | G06F 16/40 |
| | | | 715/202 |
| 2011/0138331 A1* | 6/2011 | Pugsley | G06F 16/433 |
| | | | 715/835 |
| 2012/0062688 A1* | 3/2012 | Shen | G06F 3/04886 |
| | | | 348/E7.083 |
| 2017/0255345 A1* | 9/2017 | Veeramani | G06F 11/3072 |
| 2018/0343413 A1* | 11/2018 | Herd | H04N 5/23206 |
| 2019/0007469 A1* | 1/2019 | Sanso | H04L 67/02 |
| 2020/0106813 A1* | 4/2020 | Vendrow | H04L 65/4015 |
| 2020/0412774 A1* | 12/2020 | Gunnalan | H04L 61/2575 |
| 2020/0412775 A1* | 12/2020 | Gunnalan | H04L 47/627 |

* cited by examiner

*Primary Examiner* — Delomia L Gilliard
(74) *Attorney, Agent, or Firm* — Young Basile Hanlon & MacFarlane, P.C.

(57) ABSTRACT

Selections of content shared from a remote device during a video conference are copied to a destination of a computing device connected to the video conference live or at which a recording of the video conference is viewed. The content shared from the remote device during the video conference is output at a display of the computing device. A portion of the content is selected according to an instruction received from a user of the computing device while output at the display of the computing device to copy to a destination associated with software running at the computing device. The portion of the content is identified using a machine vision process performed against the content while output at the display of the computing device. The portion of the content is then copied to the destination.

20 Claims, 10 Drawing Sheets

CROSS-MEDIUM COPYING OF SELECTIONS OF CONTENT SHARED DURING A VIDEO CONFERENCE

FIELD

This disclosure generally relates to content sharing during video conferencing, and, more specifically, to cross-medium copying of selections of content shared during a video conference to a destination.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
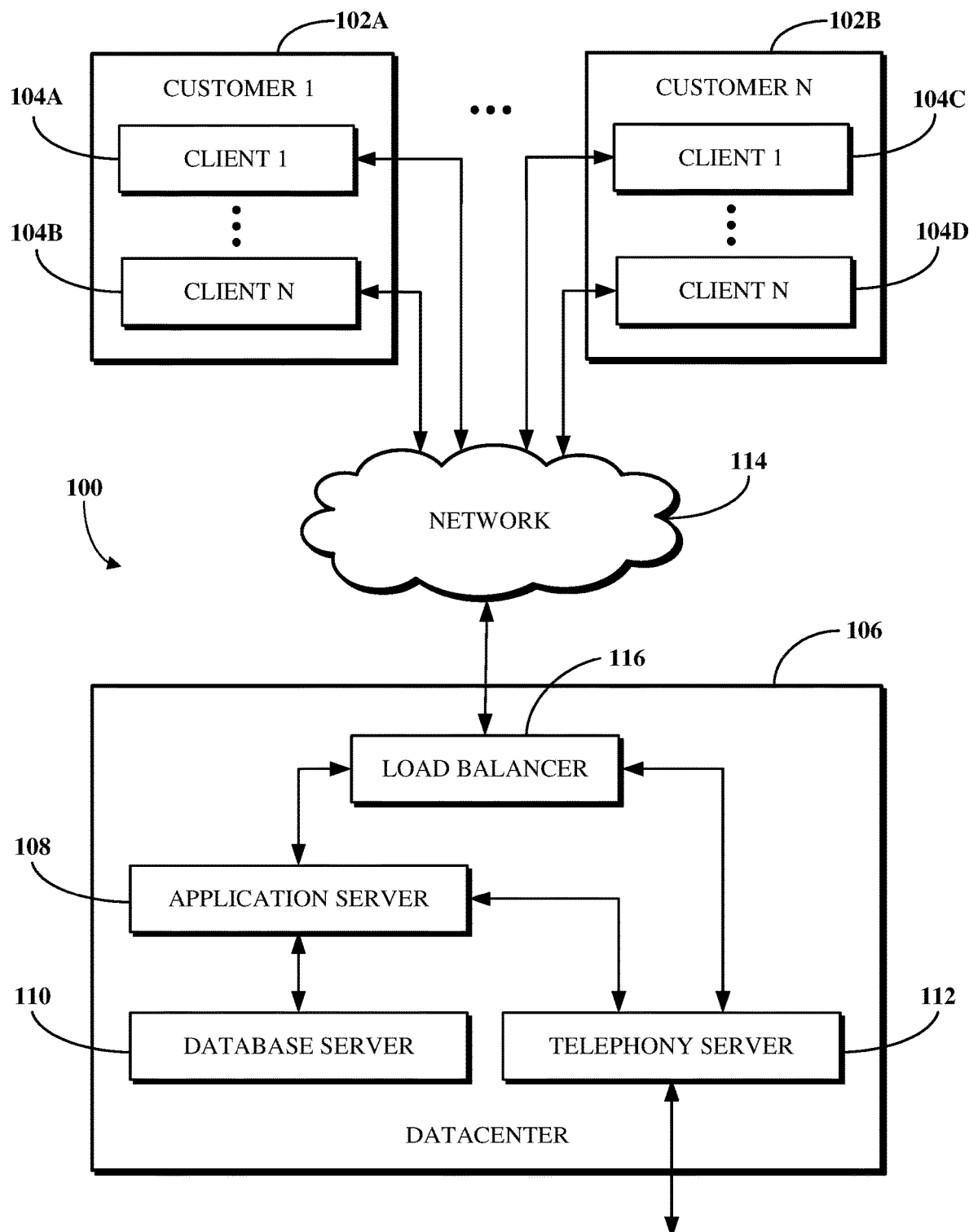
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Typically, the content of a video conference includes video streams and accompanying audio streams captured at the various participant devices and shared with others via a centralized server implementing the video conference. In some cases, however, one or more participants may share other content for presentation to some or all other participants during the video conference. Examples of such shared content include slideshow presentations, video clips, images, websites, and documents. The shared content may be stored at a source (e.g., an operating system folder) local to one of the participant devices and shared via the centralized server to the other participants by the sharer selecting it from the source at their device. Alternatively, the source of the shared content may be a different device, such as a third party server implementing a web-based storage system.

In some cases, a participant viewing the shared content may want to take notes to locally document some or all of the shared content, in summary form or in the form in which same is presented. For example, a participant viewing the shared content may be tasked with a project with which the shared content is relevant or helpful and may accordingly seek to take notes for their future work on the project. The participant may thus type out text or use a screen capture tool to copy portions of the shared content to a local destination at the participant's device. While some shared content may remain output for presentation (i.e., viewing) to participants of the video conference for a long enough period of time to enable complete note taking, this is not always the case. As such, many participants may end up with incomplete notes, thereby requiring them to either seek other information sources or attempt to obtain a copy of the shared content offline from the presenter, which is not always possible. Furthermore, a participant copying shared content, such as by typing text or undertaking a screen capture, will necessarily be diverting at least some of their attention away from the presenter to do so. Thus, the participant may miss important content spoken by the presenter while the participant is copying the shared content, even if the participant is able to copy all of the shared content. The participant may also miss other dialogue occurring during the presentation of the shared content and potentially requests from others for the participant's input.

Implementations of this disclosure address problems such as these using cross-medium content copying for copying selections of content shared during a video conference to a destination. Content shared from a remote device during the video conference is output at a display of the computing device connected to the video conference or otherwise at which a recording of the video conference is being played. The computing device may, for example, be a client device that runs a client application for connecting to the video conference or rendering a video conference recording for playback. The client application, or other software running in connection with the client application, prepares the shared content for copying using one or more machine vision processes to identify portions thereof that can be copied to a destination at the computing device. A portion of the content is selected according to an instruction to copy the portion to a destination at the computing device, in which the instruction is received from a user of the computing device while the content is output at the display of the computing device. The instruction to copy may, for example, be obtained based on user interaction with the shared content (e.g., by the user clicking on or dragging a cursor to form a boundary around a portion of the content). In some cases, the identification of the portion of the content is based on the instruction to copy. The portion of the content is then copied to the destination.

Thus, according to the implementations of this disclosure, a user of a computing device at which shared content from a remote device is being viewed can cause select portions (or all) of that shared content to be quickly and completely copied to a desired destination, such as a local document open at the computing device. Examples of machine vision processes which may be used to prepare shared content for copying from the video conference to the destination include optical character recognition (OCR) and object detection. For example, a machine vision process used with the implementations of this disclosure may be implemented using a machine learning model. The implementations of this disclosure thus enable users to effectively and quickly copy content shared during a video conference from a source remote to a computing device to a destination local to that computing without disruptions to their attention and without requiring access to the source.

To describe some implementations in greater detail, reference is first made to examples of hardware and software structures used to implement a system for cross-medium content copy. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
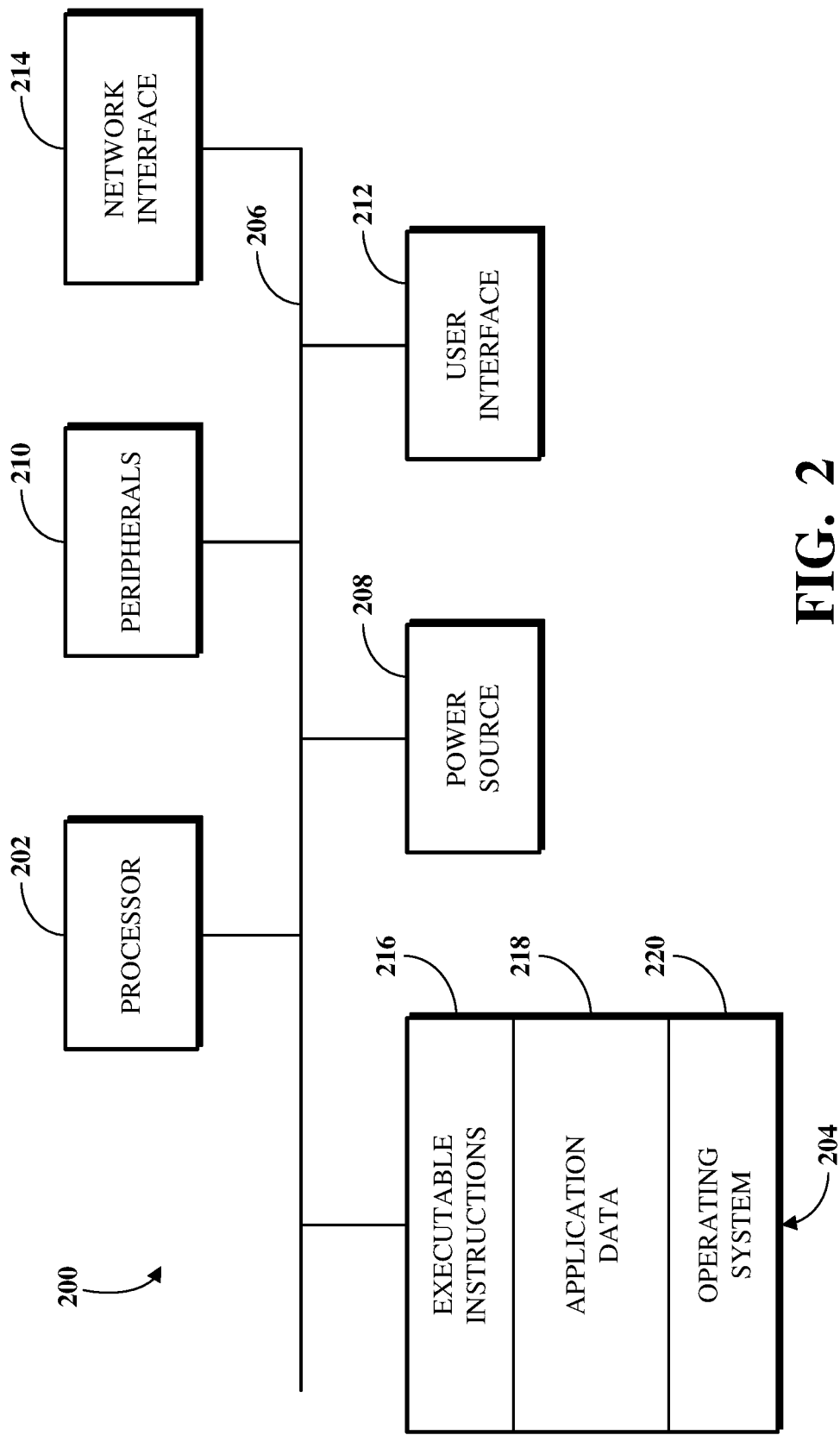
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
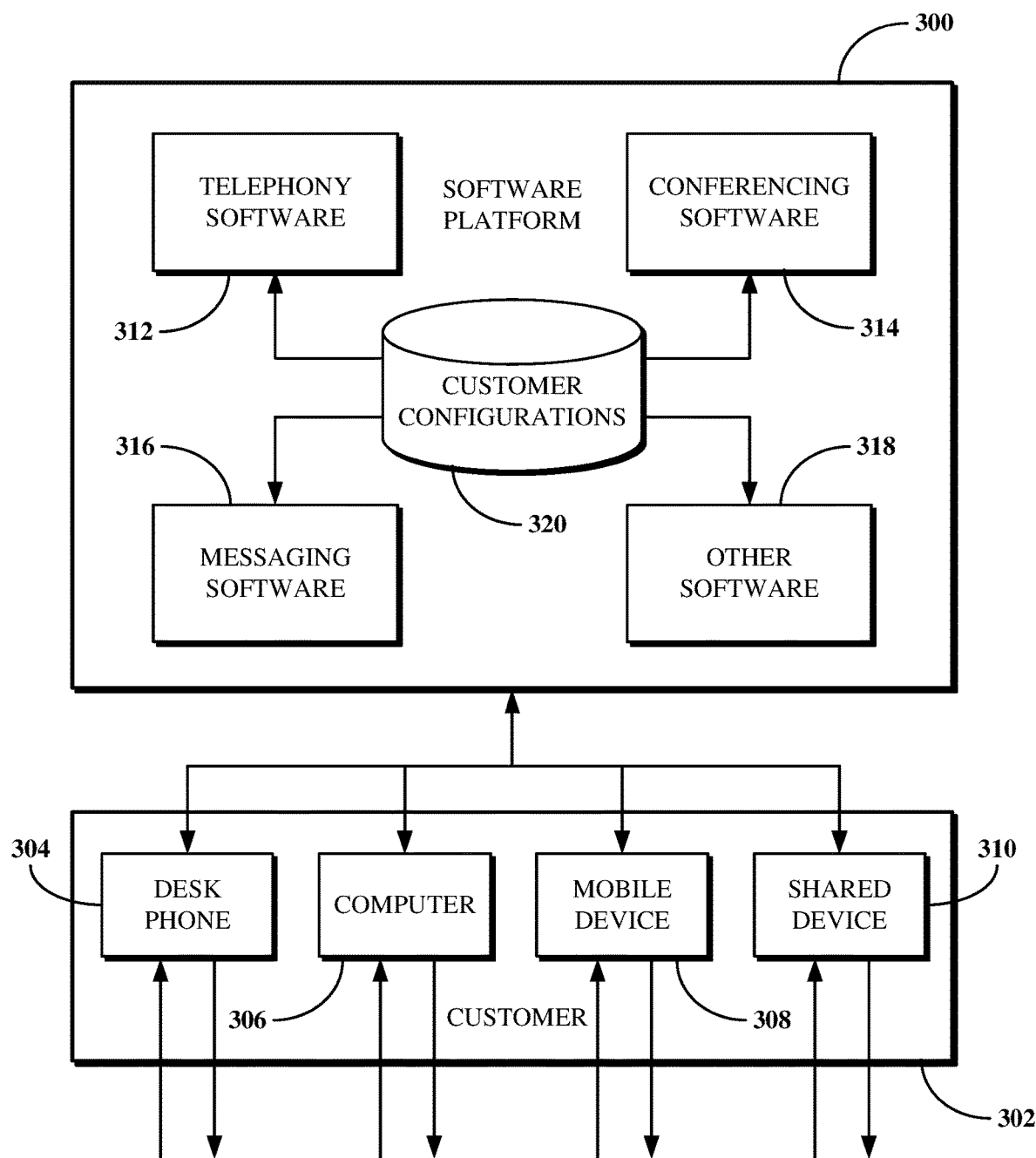
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for cross-medium content copy, for example, for copying selections of content shared during a video conference to a destination. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
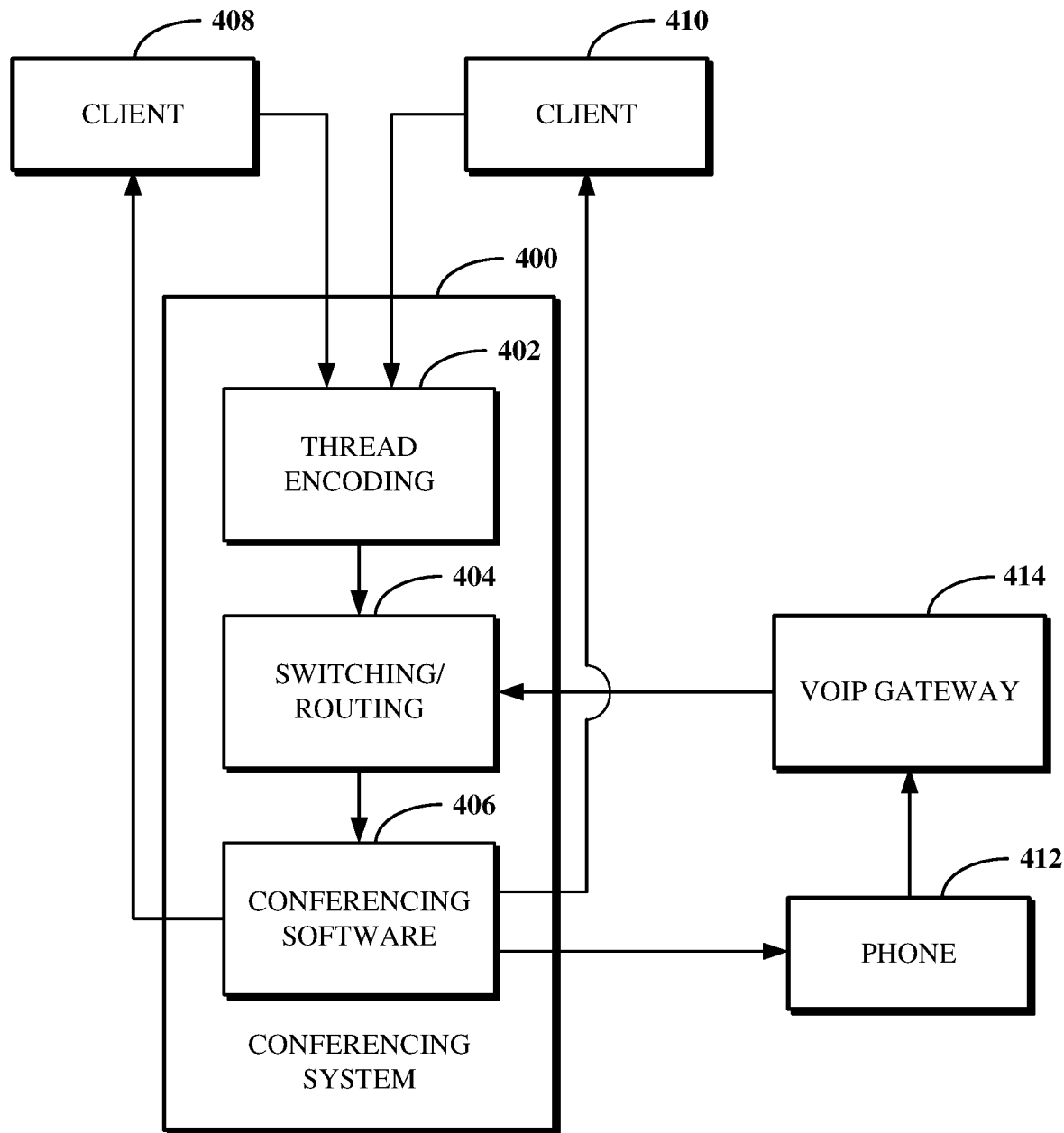
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, be the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface.

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video feed for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
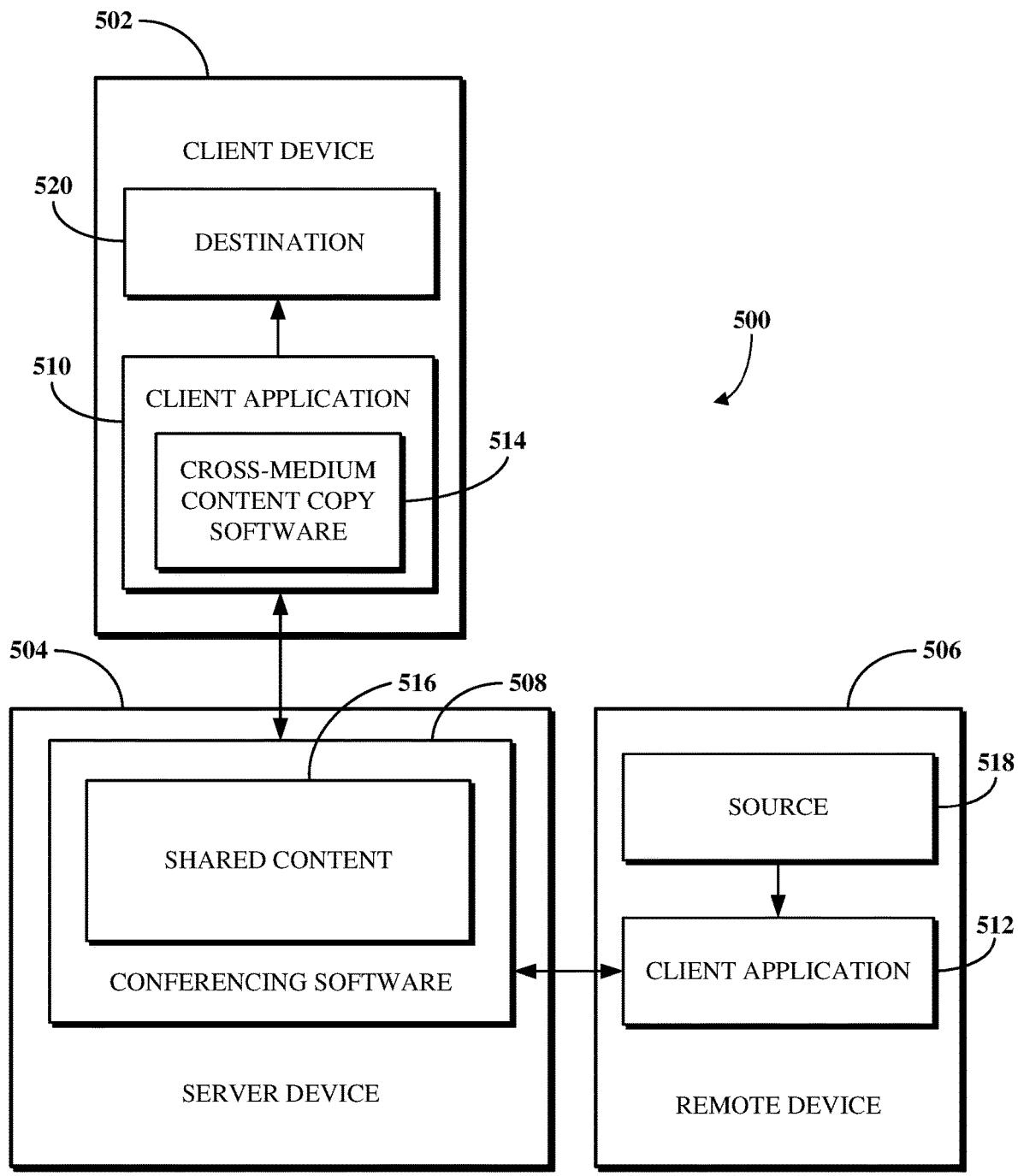
FIG. 5 is a block diagram of an example of a system for cross-medium content copy.

FIG. 5 is a block diagram of an example of a system 500 for cross-medium content copy. The system 500 includes a client device 502, a server device 504, and a remote device 506, which are all computing devices. Each of the client device 502 and the remote device 506 may, for example, be one of the clients 408 or 410 shown in FIG. 4. The client device 502 and the remote device 506 are devices used by conference participants to connect to and participate in a video conference implemented by conferencing software 508 running at the server device 504. The conferencing software 508 may, for example, be the conferencing software 406 shown in FIG. 4. The client device 502 connects to the conferencing software 508 using a client application 510, and the remote device 506 connects to the conferencing software 508 using a client application 512. The client application 510 and/or the client application 512 may, for example, be a desktop software application, mobile application, or web application associated with one or more services of a software platform, for example, the software platform 300 shown in FIG. 3. For example, the client application 510 may be software that allows a user of the client device 502 to access or otherwise use one or more of the software 312 through 318 shown in FIG. 3. The client application 510 and the client application 512 may be separate instances and/or versions of the same client-side software.

The client application 510 includes cross-medium content copy software 514 for copying shared content 516, shared from a source 518 at the remote device 506 during a video conference implemented using the conferencing software 508, to a destination 520 at the client device 502. In particular, the cross-medium content copy software 514 uses a machine vision process (e.g., OCR or object detection) to allow a participant using the client device 502 to quickly copy the shared content 516 to the destination 520 when the shared content is output for display at the client device 502 (e.g., rendered, based on data transmitted from the conferencing software 508, within a graphical user interface of the client application 510). The shared content 516 can be copied to the destination 520 even where the participant using the client device 502 does not have access to the source 518 given that the cross-medium content copy software 514 operates against the shared content 516 once it is at the server device 504 and thus under processing by the conferencing software 508.

The shared content 516 is or otherwise includes text, image, video, and/or other visual content capable of being output for display to participants of the video conference. In some cases, the shared content 516 may further include formatting data used for outputting or otherwise rendering the shared content 516 within one or more user interfaces (e.g., a graphical user interface of document processing software or slideshow presentation software). The conferencing software 508 receives the shared content 516 from the client application 512 in response to an indication that a conference participant using the remote device 506 will be sharing the shared content 516 with other participants of the video conference. For example, the indication may be or otherwise refer to input obtained at the client application 512 from the conference participant using the remote device 506 indicating to initiate a content sharing process during the video conference. In another example, the indication may be or otherwise refer to input obtained at a client application of a device used by a host of the video conference indicating to enable the client application 512 to transmit the shared content 516 to the conferencing software 508.

The source 518 is a file (e.g., a document, a slide of a slideshow presentation, or image) stored or software service (e.g., whiteboarding software, chat software, a web browser, document processing software, slideshow processing software, or image processing software) run local to the remote device 506 or otherwise accessed using the remote device 506 (e.g., a software platform or a cloud storage). The destination 520 is a file (e.g., a document, slideshow presentation, or image) stored or software service (e.g., whiteboarding software, chat software, a web browser, document processing software, slideshow processing software, or image processing software) run local to the remote device 506 or otherwise accessed using the remote device 506 (e.g., a software platform or a cloud storage). In some cases, the source 518 may be the client application 512 and/or the destination 520 may be the client application 510. In one non-limiting example, the source 518 may be a slide of a slideshow presentation and the destination 520 may be a whiteboard instantiated using whiteboarding software of a UCaaS platform. In another non-limiting example, the source 518 may be a whiteboard instantiated using whiteboarding software of a UCaaS platform and the destination 520 may be a document open within document processing software. In yet another non-limiting example, the source 518 may be a website rendered at the remote device 506 and thus caused to be rendered as the shared content 516 via the conferencing software 508 and the destination 520 may be a text box for entering a chat message within the client application 510.

A machine vision process performed by the cross-medium content copy software 514 to copy the shared content 516 to the destination 520 identifies the relevant elements of the shared content 516 (e.g., text blocks or images) when output for display at the client device 502. The cross-medium content copy software 514 enables the participant using the client device 502 to select one or more of the identified elements (e.g., by using their mouse to click on or drag a boundary around the one or more subject elements within a graphical user interface of the client application 510). The cross-medium content copy software 514 then causes the selected one or more elements, as a portion of the shared content 516, to be copied (e.g., imported) with high accuracy to the destination 520 (e.g., by dragging their mouse or using copy and paste functionality to move the selected portion of the shared content 516 to a location within the destination 520).

As has been described, the cross-medium content copy software 514 enables the selection and copying of a portion of the shared content 516 output for display at the client device 502 to the destination 520 either during the video conference (i.e., while the shared content 516 is being shared in real-time with participants of the video conference and thus while the client application 510 is connected to the conferencing software 508) or while a recording of the video conference is playing at the client device 502 (i.e., after the video conference has ended). In cases involving a recording of the video conference, a machine vision process of the cross-medium content copy software 514 may pre-process the recording of the video conference to identify the shared content 516 and elements thereof within the recording. The pre-processed information may be stored as a file that is caused to be opened when the recording is played to identify text and image elements of the shared content 516 when the recording is played at the computing device 502. For example, text elements of the shared content 516 may be pre-processed using OCR to enable those text elements to be immediately selectable once output to the display of the client device 502 during the recording.

In some implementations, the cross-medium content copy software 514 may copy the selected portion of the shared content 516 to a cache used as an intermediary store until the selected portion of the shared content 516 is moved to the destination 520. For example, the cache may be a local data store at the client device 502 accessible to the client application 510. In some cases, the cache may be instantiated by the client application 510 in response to an instruction, obtained from the participant using the client device 502, to copy a portion of the shared content 516. In some cases, the cache may be instantiated by the client application 510 in response to the client device 502 connecting to the video conference (i.e., to the conferencing software 508). In some implementations, the portion of the shared content 516, or data indicative thereof or another record thereof, may remain in the cache after the portion of the shared content 516 is copied to the destination 520. In some implementations, the portion of the shared content 516, or data indicative thereof or another record thereof, may be copied to a separate log or other record associated with the video conference and/or the participant using the client device 502.

In some such implementations where the shared content 516 is cached, some or all of the shared content 516 may be automatically copied into the cache in response to the shared content 516 being output for display at the client device 502 or in response to input received at the client application 510 (e.g., an interaction with a screen capture or like tool available within the client application 510). In such a case, the cross-medium content copy software 514 may process the shared content 516 within the cache to identify the elements thereof. The participant using the client device 502 may then select a portion of the shared content 516 to copy to the destination 520 from within the cache rather than from within a graphical user interface of the client application within which the shared content 516 is output for display.

In some implementations, the cross-medium content copy software 514 may maintain a formatting of the portion of the shared content 516 when copied in the destination 520 in the same manner as when that content is presented for sharing via the conferencing software 508. For example, a machine vision process performed by the cross-medium content copy software 514 may extract formatting information (e.g., rich text formatting and/or other font data for text, and/or arrangement information for text or other content) from the shared content 516 when copying the portion thereof to the destination 520.

In some implementations, a machine vision process performed by the cross-medium content copy software 514 may perform contextual processing to recognize portions of the shared content 516 that are not to be copied. For example, portions of the shared content 516 that are not to be copied may include portions of the shared content 516 that are unrelated to a current discussion or that are locked (e.g., according to a sharing permission or similar configuration) from copying, such as by the host of the video conference and/or the participant using the remote device 506. For example, locking portions of the shared content 516 may be performed to prevent sensitive information included in the shared content 516 from being copied.

In some implementations, the cross-medium content copy software 514 may include functionality for extracting coded information from within the shared content 516. For example, where the shared content 516 includes a quick response (QR) code, a machine vision process performed by the cross-medium content copy software 514 may analyze the QR code to identify a uniform resource indicator (URI) or other hyperlink represented by the QR code. The cross-medium content copy software 514 may, in response to the QR code being selected for copying to the destination 520, copy the QR code and/or the URI or other hyperlink identified by the analysis of the QR code. For example, the URI or other hyperlink may be expressed in a text format adjacent to (e.g., below) the QR code within the destination 520.

Figure 6:
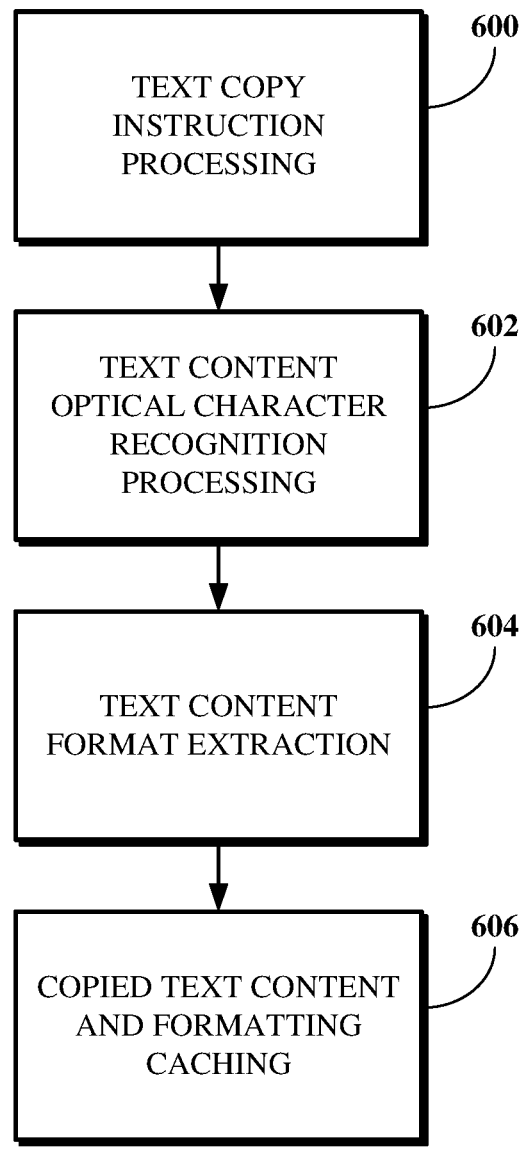
FIG. 6 is a block diagram of an example of software for copying a selection of text content from a video conference to a destination.

FIG. 6 is a block diagram of an example of software for copying a selection of text content from a video conference to a destination. As shown, the software includes text copy instruction processing software 600, text content OCR processing software 602, text content format extraction software 604, and copied text content and formatting caching software 606. The software 600 through 606 may, for example, be or otherwise represent programs, subprograms, tools, functions, routines, subroutines, operations, and/or the like of the cross-medium content copy software 514 shown in FIG. 5.

The text copy instruction processing software 600 processes instructions to copy text from content (e.g., the shared content 516 shown in FIG. 5) shared from a remote device during a video conference. The instructions may be or include input obtained from a client application (e.g., the client application 510 shown in FIG. 5) that includes the text copy instruction processing software 600. For example, the instructions may be data indicating an interaction with a content selection or copy user interface element by a user of a computing device at which the client application is running and at which the shared content is thus output for display. Alternatively, the instructions may be or include computer-generated instructions generated in response to an indication to copy the text. For example, the instructions may be generated based on an interaction with a user interface element, as described above, or based on an interaction with a graphical user interface through which the shared content is displayed (e.g., a mouse click). The instructions identify the text to be copied from within the shared content. In one example, a content selection or copy user interface element may be an interactive meeting control for performing OCR against the shared content.

The text content OCR processing software 602 performs OCR and/or other machine vision processes against the text identified by the instructions. Performing the OCR includes causing the text to be selectable for copying as text (e.g., as opposed to the text being copied within an image which also includes some portion of a background within the shared content). In some implementations, the text content OCR processing software 602 performs OCR against the shared content before the text copy instruction processing software 600 processes instructions to copy text of the shared content. For example, the text content OCR processing software 602 can perform OCR against all text within the shared content, whether the copy instructions are received during the video conference or while a recording of the video conference is output for display at the subject computing device. In such a case, the instructions to copy the text may be based on a highlighting of the OCR-processed text itself.

The text content format extraction software 604 performs a machine vision process against the text to be copied from the shared content to determine formatting information for the text. The formatting information indicates how the text is arranged and otherwise appears within the shared content (i.e., as shown in the source of the shared content, for example, the source 518 shown in FIG. 5). The formatting information can be determined by the machine vision process extracting metadata and/or other data from the shared content, such as margin or indentation information, font information (e.g., style, size, and color), line break or paragraph break information, bullet point information, a combination thereof, or the like. For example, the machine vision process can extract the metadata and/or other data by performing a visual analysis against the shared content to identify relative positions, styles, sizes, and the like of some (e.g., just the text to be copied) or all elements of the shared content. The relevant metadata and/or other data associated with the text to be copied may then be extracted. In some implementations, the text content format extraction software 604 can obtain formatting information without performing a machine vision process, for example, by obtaining the formatting information directly from the shared content. In some implementations, the text content format extraction software 604 may be omitted. In such a case, the copied text may be further processed without regard to a formatting thereof.

The copied text content and formatting caching software 606 caches the copied text and formatting information to a cache while the copied text awaits copying into a destination (e.g., the destination 520 shown in FIG. 5) at the computing device. The cache may, for example, a temporary staging area at which the copied text content may be stored until it is copied into the destination (e.g., by the user of the computing device moving the content to the destination by a mouse drag action, a copy and paste operation, or otherwise). In some implementations, a copy of all content entered into the cache at any point during the video conference (or during playback of the recording of the video conference, as the case may be) may remain in the cache. In some such implementations, a summary of the cached content may be produced at an end of the video conference (or recording thereof). For example, the summary may include other information to associate portions of the cached content with the video conference, such as excerpts from a transcript of the video conference corresponding to portions of the cached content, timestamps of the video conference at which the portions of the cached content are copied, or the like.

Figure 7:
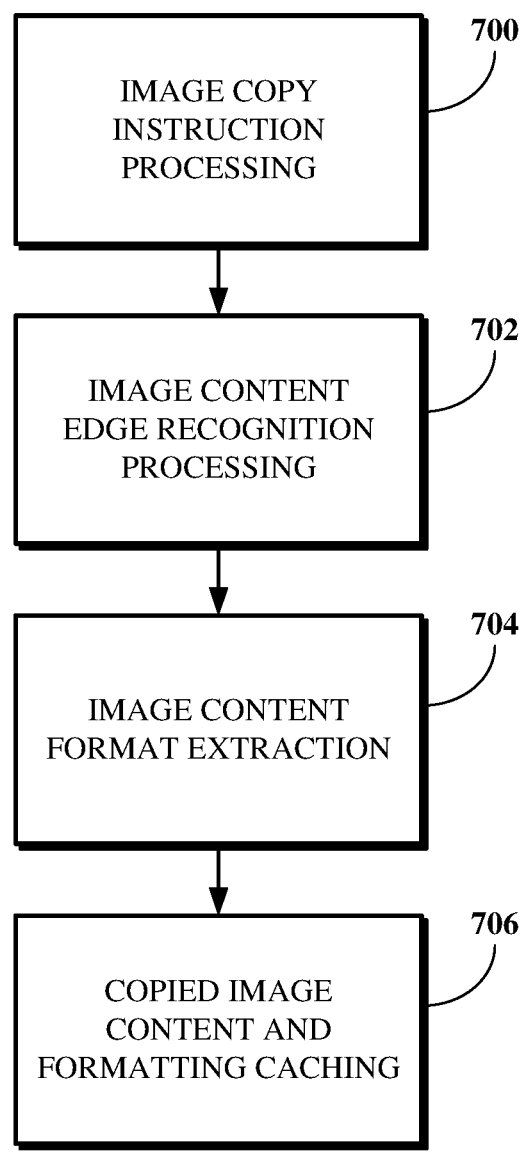
FIG. 7 is a block diagram of an example of software for copying a selection of image content from a video conference to a destination.

FIG. 7 is a block diagram of an example of software for copying a selection of image content from a video conference to a destination. As shown, the software includes image copy instruction processing software 700, image content edge recognition processing software 702, image content format extraction software 704, and copied image content and formatting caching software 706. The software 700 through 706 may, for example, be or otherwise represent programs, subprograms, tools, functions, routines, subroutines, operations, and/or the like of the cross-medium content copy software 514 shown in FIG. 5.

The image copy instruction processing software 700 processes instructions to copy an image from content (e.g., the shared content 516 shown in FIG. 5) shared from a remote device during a video conference. The instructions may be or include input obtained from a client application (e.g., the client application 510 shown in FIG. 5) that includes the image copy instruction processing software 600. For example, the instructions may be data indicating an interaction with a content selection or copy user interface element by a user of a computing device at which the client application is running and at which the shared content is thus output for display. Alternatively, the instructions may be or include computer-generated instructions generated in response to an indication to copy the image. For example, the instructions may be generated based on an interaction with a user interface element, as described above, or based on an interaction with a graphical user interface through which the shared content is displayed (e.g., a mouse click). The instructions identify the image to be copied from within the shared content.

The image content edge recognition processing software 702 performs a machine vision process for detecting edges of image content within the shared content. Detecting edges of image content includes evaluating the shared content to determine lines of pixels that form edges of images representing boundaries between those images and surrounding content or background of the shared content. For example, the edge detection may evaluate color values of pixels within a region of the shared content identified based on the copy instructions to determine the specific portion of the shared content that includes the subject image. In some implementations, the image content edge recognition processing software 702 performs edge detection against the shared content before the image copy instruction processing software 700 processes instructions to copy an image of the shared content. For example, the image content edge recognition processing software 702 can perform edge detection against the entirety of the shared content to identify all images therein, whether the copy instructions are received during the video conference or while a recording of the video conference is output for display at the subject computing device.

The image content format extraction software 704 performs a machine vision process against the image to be copied from the shared content to determine formatting information for the image. The formatting information indicates how the image is arranged and otherwise appears within the shared content (i.e., as shown in the source of the shared content, for example, the source 518 shown in FIG. 5). The formatting information can be determined by the machine vision process extracting metadata and/or other data from the shared content, such as margin or indentation information, size information (e.g., a resolution of the image), shape information (e.g., rectangular block or otherwise), a combination thereof, or the like. For example, the machine vision process can extract the metadata and/or other data by performing a visual analysis against the shared content to identify relative positions, sizes, shapes, and the like of some (e.g., just the image to be copied) or all elements of the shared content. The relevant metadata and/or other data associated with the image to be copied may then be extracted. In some implementations, the image content format extraction software 704 can obtain formatting information without performing a machine vision process, for example, by obtaining the formatting information directly from the shared content.

In some implementations, the image content format extraction software 704 may detect when a resolution of the image to copy is below a threshold, indicating a low quality version of the image. In some such implementations, based on a determination that a resolution of the image is below a threshold, the image content format extraction software 704 may search, or cause another software aspect (e.g., other software of the cross-medium content copy software 514) to search, one or more external sources for a higher quality version of the image. For example, a machine vision process can perform object recognition against the image to identify information representative of the image usable to construct keyword search queries. Those queries can then be processed using an online image search engine, and results of the search can be compared against the copied image. Where a match is identified and the version of the matching image online is of a higher resolution, the higher resolution version may be obtained in place of the version copied from the shared content. In some implementations, the image content format extraction software 704 may be omitted. In such a case, the copied image may be further processed without regard to a formatting thereof.

The copied image content and formatting caching software 706 caches the copied image and formatting information to a cache while the copied image awaits copying into a destination (e.g., the destination 520 shown in FIG. 5) at the computing device. The cache may, for example, a temporary staging area at which the copied image content may be stored until it is copied into the destination (e.g., by the user of the computing device moving the content to the destination by a mouse drag action, a copy and paste operation, or otherwise). In some implementations, a copy of all content entered into the cache at any point during the video conference (or during playback of the recording of the video conference, as the case may be) may remain in the cache. In some such implementations, a summary of the cached content may be produced at an end of the video conference (or recording thereof). For example, the summary may include other information to associate portions of the cached content with the video conference, such as excerpts from a transcript of the video conference corresponding to portions of the cached content, timestamps of the video conference at which the portions of the cached content are copied, or the like.

Figure 8:
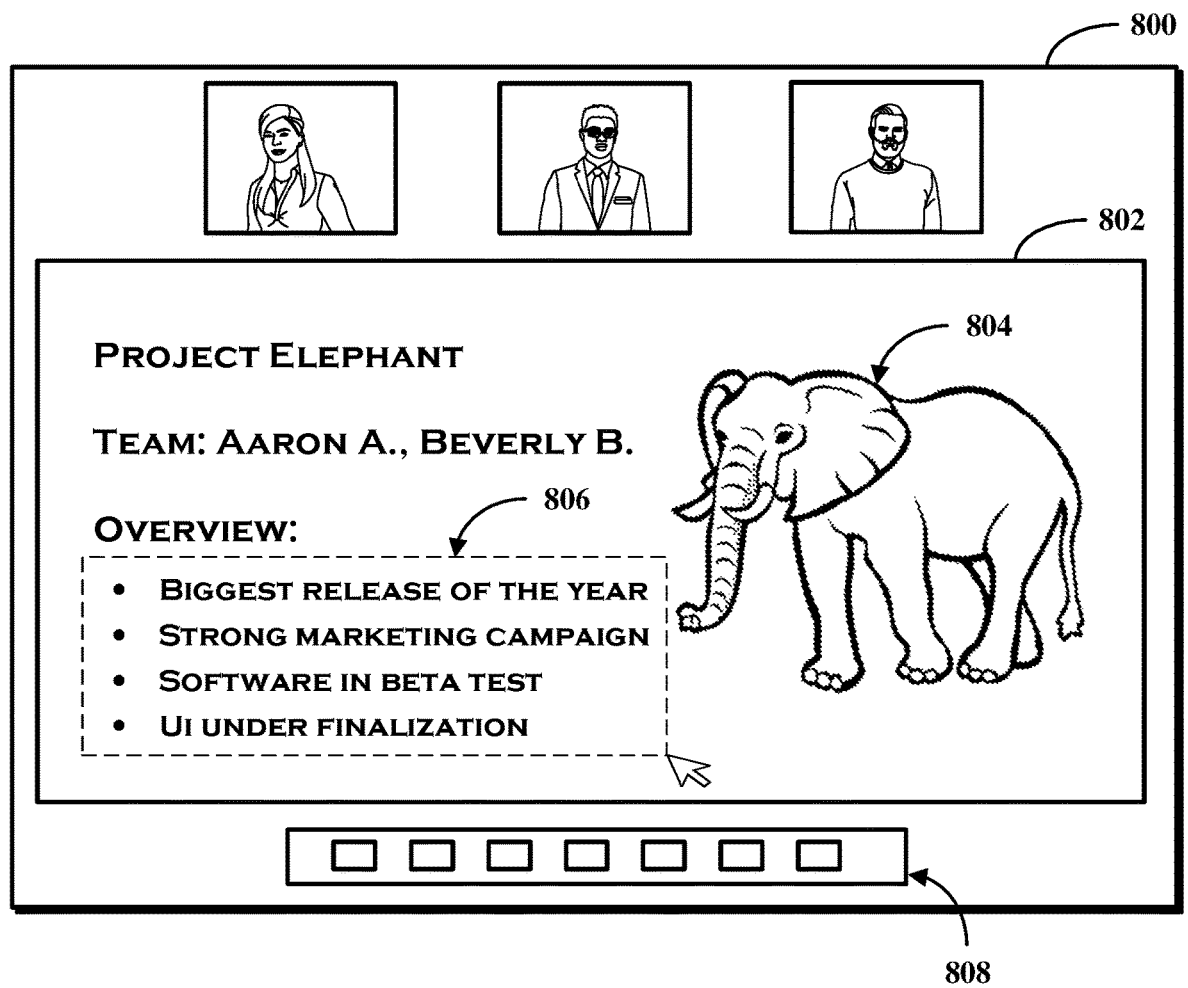
FIG. 8 is an illustration of an example of content shared during a video conference.

FIG. 8 is an illustration of an example of content shared during a video conference. In particular, a graphical user interface 800 of a client application (e.g., the client application 510 shown in FIG. 5) running at a computing device (e.g., the client device 502 shown in FIG. 5) is shown. The graphical user interface 800 is output to the display of the computing device while the client application is connected to the video conference. Alternatively, the graphical user interface 800 may represent visual content depicted in a recording of the video conference and output to the display of the computing device while the recording is played at the computing device. Various user interface tiles for the participants of the video conference are shown towards a top of the graphical user interface 800. Below those tiles, a larger region 802 includes shared content (e.g., the shared content 516 shown in FIG. 5) shared from a remote device during the video conference. The shared content includes, amongst other things, an image 804 and text 806.

A user of the computing device may seek to copy the image 804 and the text 806 to a destination (e.g., local to the computing device). For example, the user may click on the image 804 to cause cross-medium content copy software (e.g., the cross-medium content copy software 514 shown in FIG. 5) to identify the image 804, such as based on output of an edge detection process performed against some or all of the content within the region 802. In another example, and as depicted in the figure, the user may drag their mouse to form a boundary around the text 806 that they want to copy. In this case, only some of the text of the shared content is within the boundary, and so the text external to that boundary is excluded from copy at this time (although it may potentially be copied later). The copying of the image 804 and the text 806 may occur in whichever order instructed by the user of the computing device.

In some implementations, the copying of the image 804 and/or the text 806 may be in response to a selection of a meeting control during the video conference. As shown, the graphical user interface 800 includes various meeting controls 808 which may be interacted with to trigger certain functionality of the conferencing software that implements the video conference. In one example, one of the meeting controls 808, when interacted with, may trigger cross-medium content copy functionality for copying the image 804 and/or the text 806.

Figure 9:
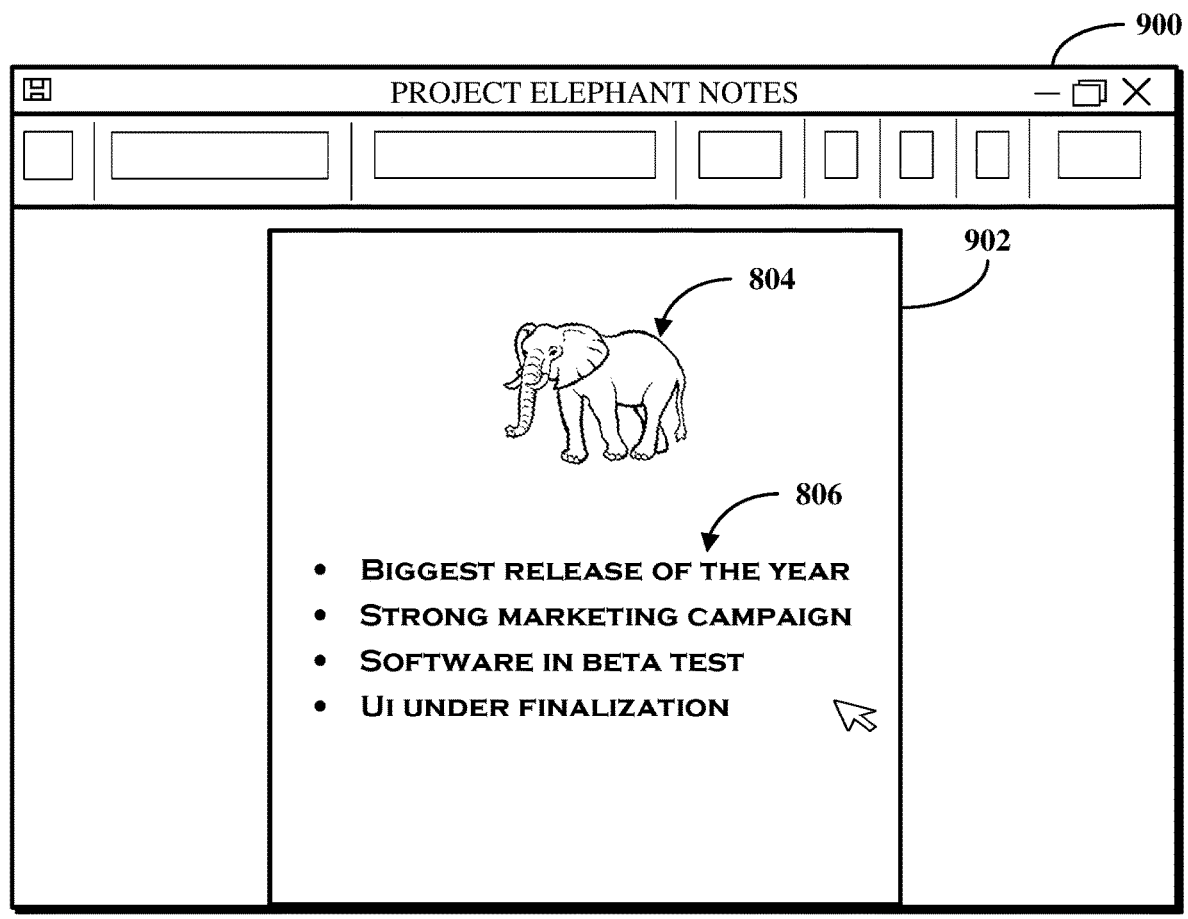
FIG. 9 is an illustration of an example of a selection of shared content copied from a video conference to a destination.

FIG. 9 is an illustration of an example of a selection of shared content copied from a video conference to a destination. In particular, a graphical user interface 900 of a software application other than a client application used to connect a computing device to a video conference (e.g., other than the graphical user interface 800 shown in FIG. 8) is shown. The graphical user interface 900 in this case is of document processing software. As shown, a document 902 is being prepared. The document 902 includes the image 804 and the text 806 shown in FIG. 8, which were copied from the shared content within the region 802 shown in FIG. 8. In particular, the text 806 is copied using the same formatting used to depict the text 806 in the region 802. For example, the text 806 is copied into the document 902 in a manner which preserves the font style and size and use of bullet points as presented in the shared content, and thus as rendered within the graphical user interface 800. The document 902 thus represents the destination to which the portion of the shared content selected for copying is copied.

Figure 10:
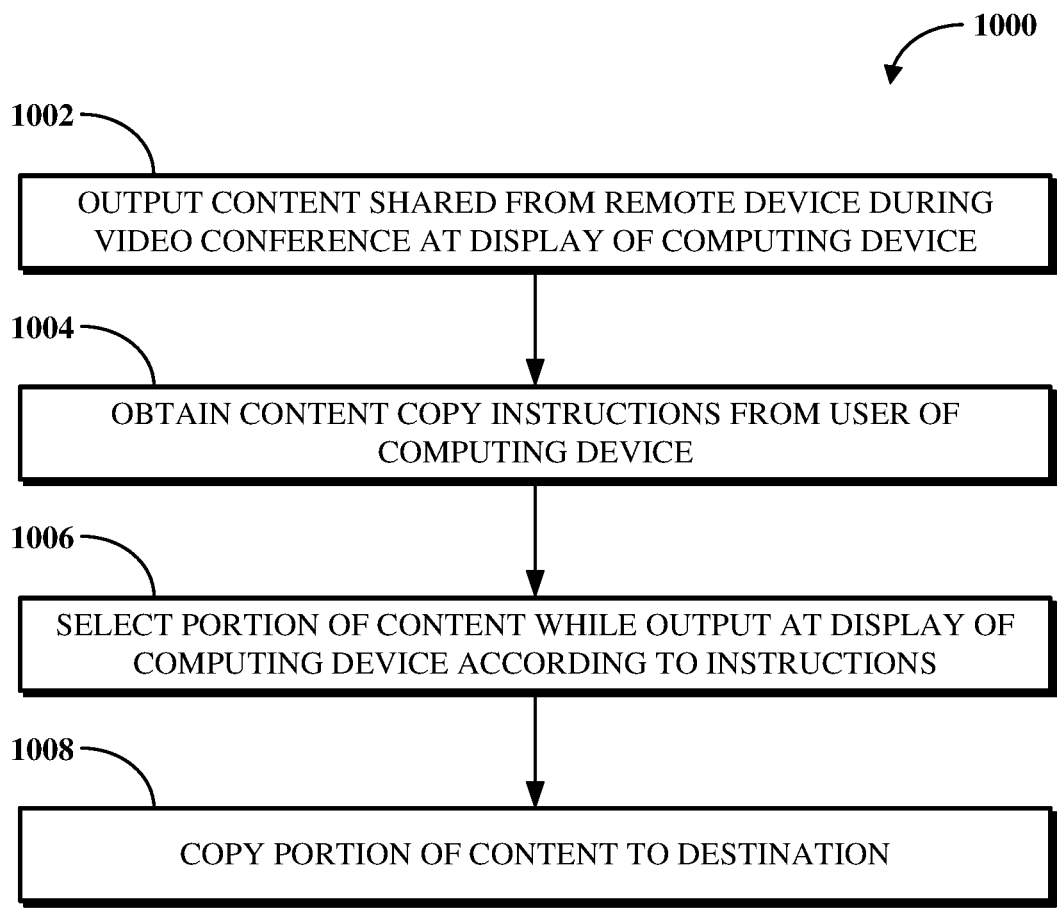
FIG. 10 is a flowchart of an example of a technique for cross-medium content copy.

To further describe some implementations in greater detail, reference is next made to examples of techniques which may be performed by or using a system for detecting a bandwidth reduction affecting a conference participant and adjusting one or more portions of a video stream based on the bandwidth reduction. FIG. 10 is a flowchart of an example of a technique 1000 for cross-medium content copy. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, content shared from a remote device during a video conference is output at a display of a computing device. In some cases, the content is output while the video conference is ongoing (i.e., while the computing device is connected to the video conference). In some cases, the content is output while a recording of the video conference is playing at the computing device (i.e., after the video conference has ended). For example, in either case, the content may be output at the display of the computing device within a graphical user interface of a client application used to connect the computing device to the video conference or to play a recording of the video conference at the computing device.

At 1004, content copy instructions are obtained from the user of the computing device. The content copy instructions, which are also referred to as an instruction received from the user of the computing device, may be or include input received via a graphical user interface of a client application running at the computing device and used to either connect the computing device to the video conference or play a recording of the video conference at the computing device, as the case may be. Alternatively, the instruction may be generated based on such input. For example, the instruction received from the user of the computing device may in some cases correspond to an interaction with the portion of the content using a mouse of the computing device. In another example, the instruction received from the user of the computing device may in some cases correspond to an interaction with a user interface element within a graphical user interface for initiating a content copy process.

At 1006, a portion of the content to copy to a destination associated with software running at the computing device is selected according to the instruction while the content is output at the display of the computing device. The portion of the content is identified using a machine vision process performed against the content while output at the display of the computing device. The destination may, for example, be within the client application used to connect the computing device to the video conference or to play a recording of the video conference at the computing device or be external to the client application.

Where the content includes text, the machine vision process may be or otherwise include an OCR process for recognizing the text within the content. For example, the machine vision process may include performing OCR to enable selection of the text. Where the content includes an image, the machine vision process may be or otherwise include an image detection process that uses edge recognition for identifying a boundary of the image. For example, the machine vision process may include performing edge detection to determine a boundary of the image within the shared content.

In some cases, such as where the content is output while the video conference is ongoing, the selection of the portion of the content occurs while the video conference is ongoing. In some cases, such as where the content is output while a recording of the video conference is playing at the computing device, the selection of the portion of the content occurs while a recording of the video conference is playing at the computing device. In some cases, the machine vision process is performed against the content based on the instruction received from the user of the computing device. In some cases, the machine vision process is continuously performed independent of the instruction received from the user of the computing device.

At 1008, the portion of the content is copied to the destination. In some cases, where the portion of the content includes text, copying the portion of the content to the destination may include maintaining a formatting of the text as presented within the content. In some cases, where the portion of the content includes an image, copying the portion of the content to the destination may include copying the image to the destination based on the boundary detected for the image. In some implementations, the technique 1000 can include storing the portion of the content within a cache, such as based on the selection of the portion of the content. For example, the portion of the content may be copied to the destination from the cache.

The implementations of this disclosure correspond to methods, non-transitory computer readable media, apparatuses, systems, devices, and the like. In some implementations, a method comprises outputting, at a display of a computing device, content shared from a remote device during a video conference; selecting, according to an instruction received from a user of the computing device, a portion of the content while output at the display of the computing device to copy to a destination associated with software running at the computing device, wherein the portion of the content is identified using a machine vision process performed against the content while output at the display of the computing device; and copying the portion of the content to the destination. In some implementations, a non-transitory computer readable medium stores instructions operable to cause one or more processors to perform operations comprising outputting, at a display of a computing device, content shared from a remote device during a video conference; selecting, according to an instruction received from a user of the computing device, a portion of the content while output at the display of the computing device to copy to a destination associated with software running at the computing device, wherein the portion of the content is identified using a machine vision process performed against the content while output at the display of the computing device; and copying the portion of the content to the destination. In some implementations, an apparatus comprises a memory and a processor configured to execute instructions stored in the memory to output, at a display of a computing device, content shared from a remote device during a video conference; select, according to an instruction received from a user of the computing device, a portion of the content while output at the display of the computing device to copy to a destination associated with software running at the computing device, wherein the portion of the content is identified using a machine vision process performed against the content while output at the display of the computing device; and copy the portion of the content to the destination.

In some implementations of the method, non-transitory computer readable medium, or apparatus, the selection of the portion of the content occurs while the video conference is ongoing.

In some implementations of the method, non-transitory computer readable medium, or apparatus, the selection of the portion of the content occurs while a recording of the video conference is playing at the computing device.

In some implementations of the method, non-transitory computer readable medium, or apparatus, the method comprises, the operations comprise, or the processor is configured to execute the instructions for performing the machine vision process against the content based on the instruction received from the user of the computing device.

In some implementations of the method, non-transitory computer readable medium, or apparatus, the method comprises, the operations comprise, or the processor is configured to execute the instructions for continuously performing the machine vision process independent of the instruction received from the user of the computing device.

In some implementations of the method, non-transitory computer readable medium, or apparatus, the content is output at the display of the computing device within a graphical user interface of a client application used to connect the computing device to the video conference or to play a recording of the video conference at the computing device, and the destination is within the client application.

In some implementations of the method, non-transitory computer readable medium, or apparatus, the content is output at the display of the computing device within a graphical user interface of a client application used to connect the computing device to the video conference or to play a recording of the video conference at the computing device, and the destination is external to the client application.

In some implementations of the method, non-transitory computer readable medium, or apparatus, the machine vision process includes an optical character recognition process for recognizing text within the content, and copying the portion of the content to the destination includes maintaining a formatting of the text as presented within the content.

In some implementations of the method, non-transitory computer readable medium, or apparatus, the machine vision process includes image detection using edge recognition for identifying a boundary of an image, and copying the portion of the content to the destination includes copying the image to the destination based on the boundary.

In some implementations of the method, non-transitory computer readable medium, or apparatus, the portion of the content includes text and the machine vision process includes performing optical character recognition to enable selection of the text.

In some implementations of the method, non-transitory computer readable medium, or apparatus, the portion of the content includes an image and the machine vision process includes performing edge detection to determine a boundary of the image within the shared content.

In some implementations of the method, non-transitory computer readable medium, or apparatus, copying of a second portion of the content is restricted according to a sharing permission.

In some implementations of the method, non-transitory computer readable medium, or apparatus, the portion of the content includes one or both of text content or image content.

In some implementations of the method, non-transitory computer readable medium, or apparatus, the method comprises, the operations comprise, or the processor is configured to execute the instructions for storing, based on the selection of the portion of the content, the portion of the content within a cache, wherein the portion of the content is copied to the destination from the cache.

In some implementations of the method, non-transitory computer readable medium, or apparatus, the portion of the content includes an image, and the method comprises, the operations comprise, or the processor is configured to execute the instructions for identifying a hyperlink encoded by the image, and copying text representative of the hyperlink to the destination.

In some implementations of the method, non-transitory computer readable medium, or apparatus, the instruction received from the user of the computing device corresponds to an interaction with the portion of the content using a mouse of the computing device.

In some implementations of the method, non-transitory computer readable medium, or apparatus, the instruction received from the user of the computing device corresponds to an interaction with a user interface element within a graphical user interface for initiating a content copy process.

In some implementations of the method, non-transitory computer readable medium, or apparatus, the method comprises, the operations comprise, or the processor is configured to execute the instructions for producing a log of all portions of the content copied at the computing device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
outputting, at a display of a computing device, content shared from a remote device during a video conference;

receiving, from a user of the computing device, an instruction to copy a portion of the content to a destination associated with software running at the computing device while the content is output at the display of the computing device, wherein the portion of the content is configured for copying using a machine vision process performed against the content at the computing device based on the instruction received from the user; and copying the portion of the content to the destination.

2. The method of claim 1, wherein instruction is received while the video conference is ongoing.

3. The method of claim 1, wherein the instruction is received while a recording of the video conference is playing at the computing device.

4. The method of claim 1, comprising:

continuously performing the machine vision process independent of the instruction received from the user of the computing device.

5. The method of claim 1, wherein the content is output at the display of the computing device within a graphical user interface of a client application used to connect the computing device to the video conference or to play a recording of the video conference at the computing device, and wherein the destination is within the client application.

6. The method of claim 1, wherein the content is output at the display of the computing device within a graphical user interface of a client application used to connect the computing device to the video conference or to play a recording of the video conference at the computing device, and wherein the destination is external to the client application.

7. The method of claim 1, wherein the machine vision process includes an optical character recognition process for recognizing text within the content, and wherein copying the portion of the content to the destination includes maintaining a formatting of the text as presented within the content.

8. The method of claim 1, wherein the machine vision process includes image detection using edge recognition for identifying a boundary of an image, and wherein copying the portion of the content to the destination includes copying the image to the destination based on the boundary.

9. A non-transitory computer readable medium storing instructions operable to cause one or more processors to perform operations comprising:

outputting, at a display of a computing device, content shared from a remote device during a video conference;

receiving, from a user of the computing device, an instruction to copy a portion of the content to a destination associated with software running at the computing device while the content is output at the display of the computing device, wherein the portion of the content is configured for copying using a machine vision process performed against the content at the computing device based on the instruction received from the user; and copying the portion of the content to the destination.

10. The non-transitory computer readable medium of claim 9, wherein the portion of the content includes text and the machine vision process includes performing optical character recognition to enable selection of the text.

11. The non-transitory computer readable medium of claim 9, wherein the portion of the content includes an image and the machine vision process includes performing edge detection to determine a boundary of the image within the shared content.

12. The non-transitory computer readable medium of claim 9, wherein copying of a second portion of the content is restricted according to a sharing permission.

13. The non-transitory computer readable medium of claim 9, wherein the portion of the content includes one or both of text content or image content.

14. An apparatus, comprising:

a memory; and a processor configured to execute instructions stored in the memory to:

output, at a display of a computing device, content shared from a remote device during a video conference;

receiving, from a user of the computing device, an instruction to copy a portion of the content to a destination associated with software running at the computing device while the content is output at the display of the computing device, wherein the portion of the content is configured for copying using a machine vision process performed at the computing device based on the instruction received from the user; and copy the portion of the content to the destination.

15. The apparatus of claim 14, wherein the processor is configured to execute the instructions to:

store, based on a selection of the portion of the content at the user device, the portion of the content within a cache, wherein the portion of the content is copied to the destination from the cache.

16. The apparatus of claim 14, wherein the portion of the content includes an image, and wherein the processor is configured to execute the instructions to:

identify a hyperlink encoded by the image; and copy text representative of the hyperlink to the destination.

17. The apparatus of claim 14, wherein the instruction received from the user of the computing device corresponds to an interaction with the portion of the content using a mouse of the computing device.

18. The apparatus of claim 14, wherein the instruction received from the user of the computing device corresponds to an interaction with a user interface element within a graphical user interface for initiating a content copy process.

19. The apparatus of claim 14, wherein the processor is configured to execute the instructions to:

produce a log of all portions of the content copied at the computing device.

20. The apparatus of claim 14, wherein the instruction is received while the video conference is ongoing or while a recording of the video conference is playing at the computing device.

* * * * *